W. D. WOODIER.
BRAKE FOR BABY CARRIAGES AND THE LIKE.
APPLICATION FILED MAY 9, 1910.
984,727.
Patented Feb. 21, 1911.
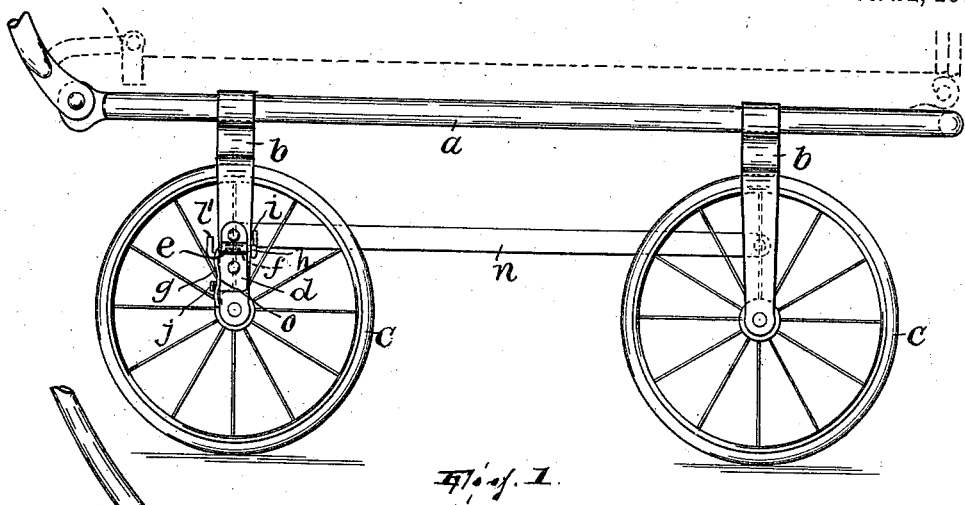
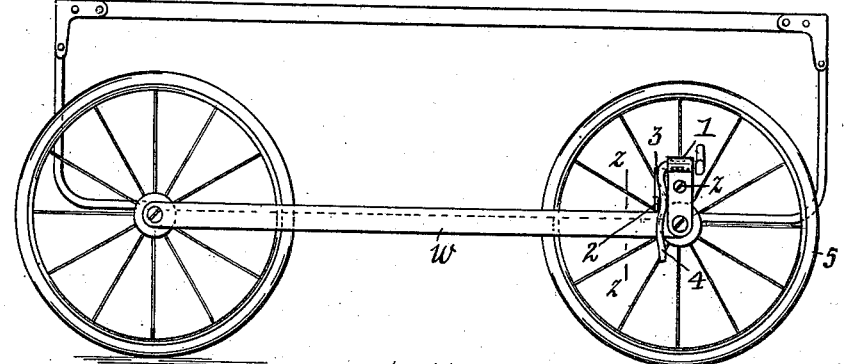
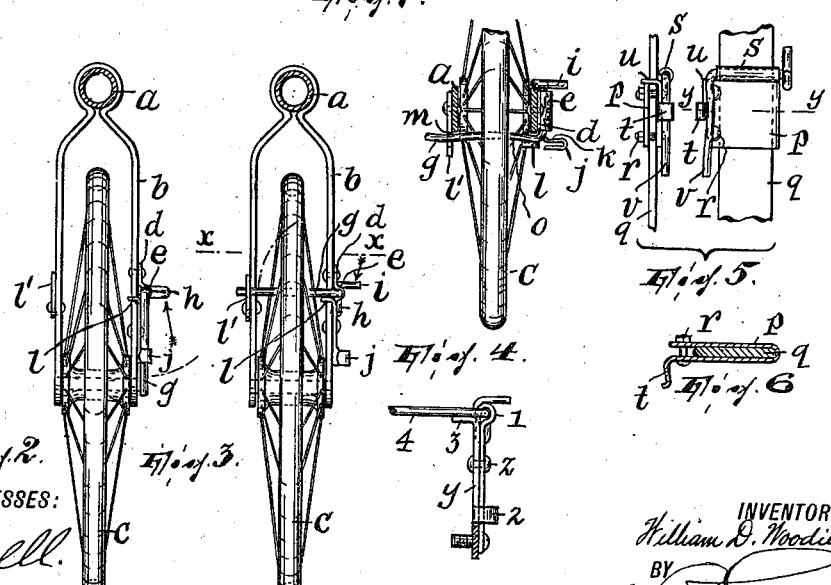
WITNESSES:
INVENTOR,
William D. Woodier,
BY
ATTORNEY

UNITED STATES PATENT OFFICE.

WILLIAM D. WOODIER, OF PATERSON, NEW JERSEY.

BRAKE FOR BABY-CARRIAGES AND THE LIKE.

984,727.

Specification of Letters Patent.   Patented Feb. 21, 1911.

Application filed May 9, 1910.   Serial No. 560,234.

*To all whom it may concern:*

Be it known that I, WILLIAM D. WOODIER, a citizen of the United States, residing in Paterson, Passaic county, and State of New Jersey, have invented a certain new and useful Improvement in Brakes for Baby-Carriages and the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to baby carriages and wheel vehicles of that nature and it has for its object to provide a substantial, inexpensive and readily operated and reliable device for preventing the movement of the vehicle, the same being so constructed as to make it more capable of application to various styles or kinds of such vehicles than are brakes designed to engage a wheel or wheels of the vehicle peripherally, which usually have to be constructed with special reference to the character of the frame of the particular style of carriage or the like to which they are adapted.

The invention has been fully illustrated in the accompanying drawing, wherein,

Figure 1 is a side elevation of the running gear of a baby carriage provided with the improved stop or check; Fig. 2 is a rear elevation of so much of what is shown in Fig. 1 as directly includes the stop or check; the latter being in the idle position; Fig. 3 is a view like Fig. 2, the stop or check being in acting position; Fig. 4 is a plan view, partly in section on line $x$—$x$ of Fig. 3, of what is seen in Figs. 2 and 3, the stop or check being in the acting position; Fig. 5 is a plan and side view illustrating a modification of the invention; Fig. 6 is a sectional view of a certain bracket in Fig. 5, the section being on line $y$—$y$ in said figure; Fig. 7 is a side view of a further modification; and, Fig. 8 is a vertical sectional view thereof on line $z$—$z$.

In Fig. 1, the frame $a$ of the vehicle has the forks $b$ in which are journaled the wheels $c$. To the outer member of one of the forks is riveted a bracket $d$ in the form of a plate having a horizontal bend $e$ formed therein to project outwardly, thereby producing a bearing. In this bearing is journaled the improved stop or check. This is preferably composed of a piece of stout wire having a straight bearing-portion $f$ journaled in said bearing, an arm $g$ (forming one end-portion of the wire) which extends substantially at right angles to the bearing portion, and two lugs $h$ and $i$ (formed in the other end-portion of the wire) projecting the former at about 90° with respect to arm $g$ (and outwardly, when the stop is in the idle position) and the latter at about 180° with respect to arm $g$; it will be understood that arm $g$ and the part of the wire which comprises lugs $h$ and $i$ coact to prevent endwise movement of the stop in its bearing by abutting against the sides of the bracket $d$. A rebend in the wire (Fig. 2) forms the lug $h$, while the extreme end thereof forms the lug $i$, (Fig. 3). At the side of the bracket $d$ which adjoins the arm $g$ said bracket has an outwardly projecting catch $j$; when the arm is turned to its idle position (Fig. 2) it wipes against one side of this catch which, being slightly concave at $k$, retains the arm down. At the same side of the bracket and above the catch a part of the metal of the bracket is bent back, forming an abutment or rest $l$; when the arm is turned to its acting position, between the spokes of the wheel, this rest $l$ supports it. The arm $g$ is made long enough, by preference, so as to extend from the fork member on which it is mounted to the other or complementary fork member, which latter preferably carries another rest $l'$ which may be notched, as at $m$, to receive the arm when the latter is thrown into the acting position (Fig. 3). This rest may, if desired, be the end of a brace $n$ connecting the two forks at one side of the carriage frame.

Fig. 4 shows a slight bend at $o$ in the arm $g$; the object of this is to adapt the portion of the arm which is directly engaged by the spoke contacting therewith to the angle of the spoke, whereby the latter may not act to raise the arm by a wiping effect and thereby neutralize its checking action.

The operation is as follows: The stop being in its idle position, the lug $h$ is pressed upon from beneath (see the arrow, Fig. 2), thereby releasing it from the catch and turning it into the position shown in Fig. 3, where its arm $g$ is supported by rests $l$ and $l'$ and extends between two of the spokes of the wheel, blocking the rotation of the latter. To return the stop, the lug $i$ is pressed upon from above (see the arrow, Fig. 3).

In the previous construction, the device is shown secured by rivets to the frame. In Figs. 5 and 6 the device is shown constructed so that it may be readily attached by the user. In this case the bracket $p$ is in the form of a strap adapted to embrace the fork $q$ or the other part of the frame and having the bolts $r$ whereby to clamp it in place. $s$, $t$ and $u$ are parts corresponding to and formed substantially in the same manner as the bearing $e$, catch $j$ and rest $l$, already described. The stop $v$ is formed and arranged also the same as the stop already described.

Should the vehicle not afford a convenient means for attaching the device, such as the fork $b$, the construction shown in Figs. 7 and 8 may be used. Here $w$ is a flat bar which may connect the axles of a front and a rear wheel (thereby incidentally bracing the frame of the vehicle). One end $y$, of this bar is turned up and then bent downwardly upon itself, the two parts of the thus bent portion being secured together by the screw or rivet $z$. When the bend is formed provision is made for the bearing 1, corresponding to the bearing $e$ already described; 2 and 3 are the catch and rest corresponding to the catch $j$ and rest $l$ already described. The stop 4 is arranged and constructed in substantially the same manner as the stop already described. When the stop is thrown into the acting position, so that its arm projects between two of the spokes of the wheel 5, it is in this instance supported only by the rest 3.

Having thus fully described my invention, what I claim as new and desire to secure by Letters Patent is:

1. The combination, with the frame and a wheel of a wheel vehicle, of a wheel stop carried by the frame and pivoted on a substantially horizontal axis and comprising an arm movable into engagement with the wheel and two operating lugs projecting radially at substantially 90° to each other, substantially as described.

2. The combination, with the frame, and a wheel of a wheel vehicle, of a bracket secured to the frame, said bracket having a catch at one side thereof, and a wheel stop pivoted in the bracket in a different horizontal plane from that of the catch and comprising a horizontally arranged axial or bearing portion and an arm projecting from one end of said axial portion and movable in one direction into engagement with the wheel and in the other direction into engagement with the catch, substantially as described.

In testimony, that I claim the foregoing, I have hereunto set my hand this 7th day of May, 1910.

WILLIAM D. WOODIER.

Witnesses:
JOHN L. STEWARD,
WM. D. BELL.